United States Patent [19]

Thompson et al.

[11] 4,234,641
[45] Nov. 18, 1980

[54] FOAM PLASTICS SHEET MATERIALS

[75] Inventors: David R. Thompson, Preston; John P. Tomlinson, Darwen, both of England

[73] Assignee: Reed International Limited, England

[21] Appl. No.: 56,323

[22] Filed: Jul. 10, 1979

[51] Int. Cl.$^2$ .............................................. B32B 5/20
[52] U.S. Cl. ............................... 428/159; 428/172; 428/310; 427/244; 8/478
[58] Field of Search ............... 428/158, 159, 160, 172, 428/310, 914; 8/14; 427/244

[56] References Cited

U.S. PATENT DOCUMENTS

| | | | |
|---|---|---|---|
| 3,905,849 | 9/1975 | Bomboire | 428/159 |
| 3,914,485 | 10/1975 | Curtis | 428/160 |
| 3,931,429 | 1/1976 | Austin | 428/158 |
| 3,978,258 | 8/1976 | Faust et al. | 428/159 |
| 4,068,030 | 1/1978 | Witman | 428/172 |

*Primary Examiner*—William J. Van Balen
*Attorney, Agent, or Firm*—Larson, Taylor and Hinds

[57] ABSTRACT

Foam plastics sheet material, such as a wallcovering, has graduated color toning. The material comprises a substrate web having a pigmented base coat and a foam coat in which the pigment has migrated to the surface of the foam coat in varying degrees, or, in some areas, not at all.

The foam coat can have at least two thicknesses or can be applied to a pre-embossed substrate web.

11 Claims, 1 Drawing Figure

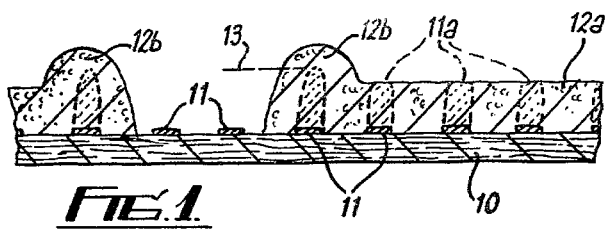
FIG.1.
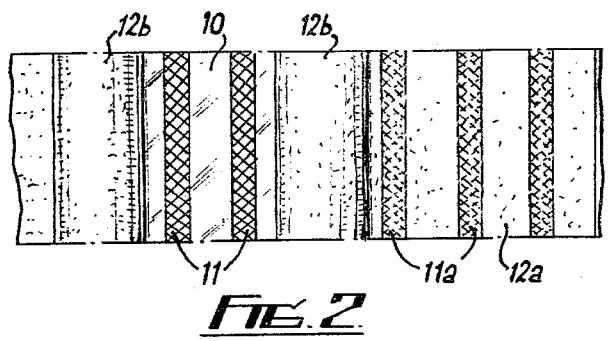
FIG.2.
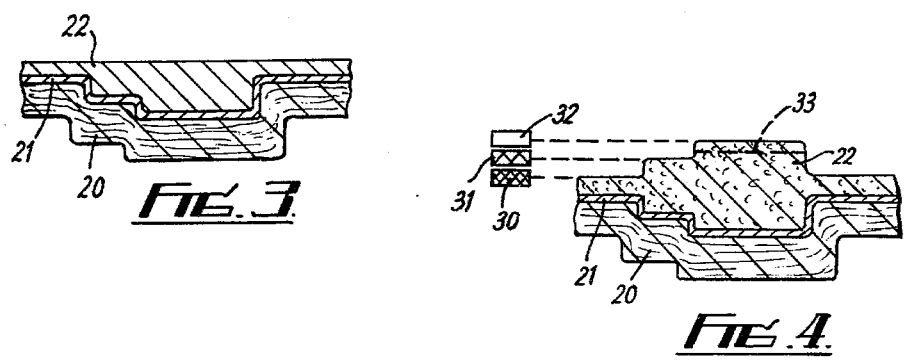
FIG.3.
FIG.4.
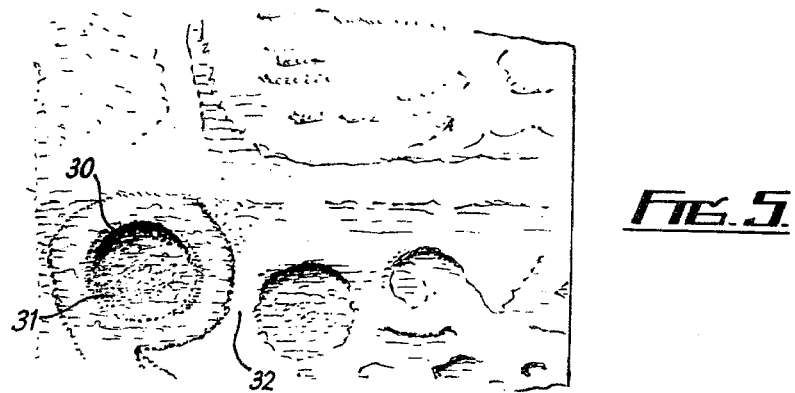
FIG.5.

FOAM PLASTICS SHEET MATERIALS

BACKGROUND OF THE INVENTION

This invention relates to foam plastics sheet materials having a decorative finish such as wallcovering materials.

The invention is concerned, for example, with the production of foamed wallcoverings having decorative effects based mainly on comparative colour intensity. Such effects can be achieved by the necessary number of printing operations, possibly with simultaneous mechanical embossing, but this tends to increase cost and the practical range of variation becomes limited.

SUMMARY OF THE INVENTION

The invention aims to provide a new way of producing, in foam wallcovering and the like, decorative effects based on colour intensity without the need for supplementary printing operations and mechanical embossing. At the same time as providing an easy way of controlling colour intensity, the control can be corelated and registered with relief decorative effects.

Quite remarkable decorative effects may be achieved on a production scale plant in a very simple manner.

The material according to the invention comprises a substrate web having thereon a base coat and a foam coat characterised in that the base coat comprises an organic pigment and some of the pigment has migrated through the foam coat to the surface of the foam coat so that the overall surface of the material exposes two different colourations.

The coats may be partial or overall so long as a part of the foam coat overlaps the base coat to give a migration path.

The two colourations may differ in intensity or differ in spectral position.

The foam coat may have varying thickness so that the amount of pigment migrating to the surface varies according to the thickness.

The invention also provides a process for the production of a decorative sheet material comprising applying to at least parts of the surface of a substrate web a composition containing an organic pigment, applying, over at least some of the parts of the substrate to which said organic pigment had been applied, a foamable composition containing a thermoplastic polymeric material and a heat decomposable blowing agent, and heating said coated substrate to effect foaming of the foamable composition, wherein said organic pigment is soluble in, and migrates into, said foamable composition to the extent that some appear on the surface of the material.

The pigment composition may be printed on to selected areas of the substrate and then the foamable composition may be applied as an overall coating. Alternatively, if the foamable composition is applied only to some of the areas to which the pigment composition has been applied (whether or not the pigment composition had been applied overall), the foam areas above the migratory pigment bearing areas of the substrate will be depicted in a colour or tone contrasting to that of those areas where the pigment composition, but not the foam composition, had been applied. Both the migratory pigment composition and the foam composition may be applied as overall coatings with the foam composition varying in thickness, such as by applying a foamable composition of varying thickness or by using a chemical embossing technique or coating on to a pre-embossed substrate. The valleys regions of the foamed material will then exhibit a deeper colouration than the peaks.

The amount of migratory pigment, in the areas to which the migratory pigment composition is applied, is preferably in the range 0.1 to 5 g/m$^2$. By using in the migratory pigment composition one or more non-migratory pigments, further decorative effects can be achieved if the foam composition is not applied as a coating overall. A colour change can be derived also by having mixed pigments only one of which migrates.

The substrate web may be any sheet or film material or may be a textile web. Particularly suitable substrates include paper, board, wood, plastics film or sheet, and woven or non-woven textiles made of natural or synthetic fibrous materials. The substrate web may be given a coating, over some or all of its surface, of a material containing a polymeric binder prior to application of the migratory pigment composition.

In the case of a paper substrate, an overall ground coat may be applied. In some cases, particularly where an overall migratory pigment coating is desired, the ground coat may form the migratory pigment coating by incorporation of the migratory pigment into a conventional ground coat.

The migratory pigment composition preferably contains a polymeric binder. The binder may be thermoplastic or thermosetting and may be a synthetic or a natural polymeric material. Examples of binders include the thermoplastic polymeric materials listed hereinafter in relation to the foamable composition, thermosetting polymers such as polyurethanes, phenol formaldehyde, urea formaldehyde, or melamine formaldehyde resins, synthetic rubbers, natural polymeric materials such as rubber, starch, gums and rosins.

The migratory pigment composition may be applied in liquid form and dried or fused or by application of a powdered or particulate migratory pigment to an adhesive layer on the substrate. The migratory pigment composition may be an ink or lacquer containing the migratory pigment. Alternatively it may comprise a plastisol.

Examples of suitable thermoplastic polymeric materials that may be used as binder in the migratory pigment composition and in the foamable composition include polymers or copolymers of at least one ethylenically unsaturated monomeric material selected from olefins, for example, ethylene, propylene, butene, isobutene; vinyl chloride; vinyl esters, for example vinyl acetate; vinylidene chloride; vinyl ethers; acrylonitrile; esters of acrylic or methacrylic acids, for example methyl acrylate, ethyl acrylate, butyl acrylate, and methyl methacrylate; acrylic or methacrylic acids; styrene; butadiene; and isobutylene.

Other polymers that may be used include thermoplastic cellulosic polymers such as cellulose acetate and cellulose nitrate. Mixtures of polymers may be employed.

Preferred thermoplastic polymeric materials include homopolymers of vinyl chloride and copolymers of vinyl chloride with comonomers such as vinyl acetate, vinyl ethers, vinylidene chloride and olefins; copolymers of esters of acrylic or methacrylic acids; and cellulose nitrate. Vinyl chloride homo and copolymers are particularly preferred.

Where the main coating composition is a vinyl chloride polymer plastisol, suitable organic pigments for the preliminary coating are those that are soluble in the plasticiser employed. Examples of such pigments include C.I. Pigment Red 5, 7 and 112; C.I. Pigment Yellow 1 and 3: C.I. Pigment Orange 5; C.I. Pigment Violet 2; and C.I. Pigment Green 7. The C.I. Pigment numbers refer to the classified group of pigments as set out in the "Society of Dyers and Colorists, Colour Index" second edition and supplement 1963.

The migratory pigment composition may contain the same or different polymeric material to that contained in the foamable composition.

Additives that modify the decomposition temperature of the blowing agent may be incorporated into the composition.

The migratory pigment composition may itself contain a heat decomposable blowing agent.

The foamable composition is preferably applied at a rate of 40 to 1200 g of binder material in the foamable composition per square meter of substrate.

The foamable composition preferably contains 0.5 to 15%, particularly 1 to 10%, by weight of blowing agent, based on the weight of the binder material in the composition. By the term binder material we mean the non-volatile components of the coating composition, that, on heating, coalesce to form an integrated film. In computing the quantity of binder material, inorganic non-film forming ingredients such as fillers and pigments are excluded.

A printed pattern may be applied, if desired, by known printing techniques, to the substrate bearing the layer of the foamable composition. Additionally, or alternatively, a wear layer of transparent polymeric composition, e.g. an unpigmented vinyl plastisol, may be applied. Where, after application of the foamable composition, the substrate is printed, whether with an ink containing a compound that modifies the decomposition temperature of the blowing agent or simply with a decorative ink, the wear layer, if used, should be applied after application of the ink. The coating compositions may contain other conventional ingredients, e.g. pigments, dyes, fillers, extenders, plasticisers, stabilisers, and viscosity modifiers.

After application of the foamable composition, and after application of any printing and or wear layers thereto, the coated substrate is heated to cause foaming. Where the migratory pigment composition contains a heat decomposable blowing agent, it should not be foamed prior to application of the foamable composition unless the migratory pigment composition is of such a nature that, on decomposition of the blowing agent, a residual foamed coating is obtained. This is largely a matter of the proportion of the binder material relative to the proportion of other ingredients, such as pigments, in the migratory pigment composition. Thus if the proportion of binder is such that the coating of the migratory pigment composition is merely a layer of blowing agent, migratory pigment, and any other solid ingredients adherent to the substrate, rather than a continuous matrix of the binder encapsulating the solid ingredients, upon heating to decompose the blowing agent, the gas evolved will be lost to the atmosphere and little or no foaming will occur. In such cases it is necessary that the blowing agent in the migratory pigment composition is not decomposed until after application of the foamable composition.

The invention will now be described further with reference to the accompanying drawings and examples.

BRIEF DESCRIPTION OF DRAWINGS

FIG. 1 is a sectional view of material according to the present invention;

FIG. 2 is a plan diagrammatic view of the material shown in FIG. 1;

FIG. 3 is a sectional view of another material according to the present invention in the course of manufacture;

FIG. 4 is the material of FIG. 3 at the end of manufacture; and

FIG. 5 is a plan diagrammatic view of the material of FIG. 4.

DESCRIPTION OF PREFERRED EMBODIMENTS

In FIG. 1 a base paper 10 has applied to it a pattern in the form of spaced parallel lines 11 of pigmented ink (exaggerated in the depth dimension). This was dried and then partially coated with a plastisol at two thicknesses 12a, 12b and the plastisol was foamed.

The lines 11 which were not covered with foam (indicated in FIG. 2 by close cross-hatching) presented their strong original colour. The lines 11 below foam thickness 12a migrated through the foam to reach the surface (indicated by open cross-hatching) to present the pigment colour 11a reduced in intensity. At the foam thickness 12b, pigment migration had taken place but the surface of the material had not been reached, level 13 only being reached.

In FIG. 3, an embossed paper base 20 has been given an overall coating 21 of pigmented ink (exaggerated in the depth dimension). This overall coating 21 was then itself coated overall with a foamable plastisol composition 22, the composition being at various depths by reason of the embossing of base 20. The plastisol composition 22 was then heated to cause the plastisol to foam and take up various depths and the pigment in the ink to migrate. Pigment migrates intensely to level 30 (as indicated by the close hatched box); it migrates weakly to the level 31 (as indicated by the open hatched box); and migration stops at level 33 and hence level 32 of the foam is unpigmented.

Three examples of the invention will now be given. In these examples all parts and percentages are by weight.

EXAMPLE 1

(This example can be related to FIGS. 1 and 2 of the drawings)

A brown printing ink was made up to the following formulation:

|  | Parts |
| --- | --- |
| Styrene/acrylic polymer emulsion | 13.0 |
| Polyvinyl alcohol soln. | 26.0 |
| Water | 70.0 |
| Wetting agent | 0.25 |
| 0.92 Ammonia | 0.2 |
| Clay | 100.0 |
| C.I. Pigment Orange 5 | 10.0 |
| Red Oxide | 7.5 |
| Black | 0.5 |

A white grounded wallpaper base paper of substance 120 gm$^{-2}$ was printed flexographically with the ink in a simple design consisting of lines and dots.

The printed paper was dried and then screen printed with a PVC plastisol of the following formulation in a series of broad stripes of thickness 0.1 mm.

|  | Parts |  |
| --- | --- | --- |
| Vinyl chloride homopolymer | 100 | |
| Dicaprylphthalate (plasticiser) | 55.5 | Binder |
| Epoxidised oil (stabiliser) | 3 | material |
| Viscosity depressant | 3 | |
| Titanium dioxide | 21 | |
| Cadmium/zinc octoate (activator) | 4 | |
| Azodicarbonamide (blowing agent) | 5.5 | |

The plastisol print was gelled at 150° C. for 20 secs. and then a second plastisol of the same formulation overprinted onto the gelled print in the form of a few narrow stripes.

The wallcovering was then heated at 200° C. for 60 secs. to expand the vinyl print.

The single layer of plastisol expanded to a thickness of 0.6 mm and showed the original flexo print design in orange where the orange pigment alone had migrated into the foam layer on heating. This contrasted with the original dark brown print design in the valleys between the plastisol print.

The double thickness of plastisol print expanded to a thickness of 1.3 mm and showed no migration of the pigment, remaining completely white.

EXAMPLE 2

(This example can be related to FIGS. 3, 4 and 5 of the drawings)

A 150 gm$^{-2}$ wallpaper base paper was given an all over air knife coating of an orange ground coat of the following formulation:

|  | Parts |
| --- | --- |
| Styrene/acrylic polymer emulsion (50% solids) | 18.0 |
| Wetting Agent | 0.12 |
| Clay | 50.0 |
| 0.92 Ammonia | 0.5 |
| Cellulose thickener (1% soln.) | 3.0 |
| Defoamer | 0.06 |
| Water | 42.5 |
| C.I. Pigment Orange 5 | 6.0 |

The coating was dried at 120° C. to give a dry weight of 25 gm$^{-2}$ and then the coated paper mechanically embossed with an overall design having many different depths of emboss.

The embossed paper was then given an all over coating of foamable plastisol of formulation as in example 1 by means of a knife over roller coater.

Total plastisol coat weight was 150 gm$^{-2}$ but the coat thickness varied depending on the depth of emboss in the paper.

The coating was then foamed by heating at 200° C. for 75 secs.

The resulting product showed the emboss in the paper in reverse relief and had the appearance of being valley inked.

Where only a thin layer of PVC had been coated the orange pigment had migrated through to the surface but in the high relief areas where the thickness of foam was greater than 1.0 mm the foamed PVC remained white. In between the extremes the orange colouration varied in strength as the foam thickness varied.

EXAMPLE 3

(This example also uses the invention disclosed in our co-pending application which claims priority from GB 30409/78 and 30408/78)

A printing ink was made up to the following formulation:

|  | Parts |
| --- | --- |
| Styrene/acrylic polymer emulsion (50% solids) | 8 |
| Aqueous polyvinyl alcohol solution (12½%) | 8 |
| C.I. Pigment Violet 2 | 5 |
| Water | 97 |
| p,p-oxybis (benzenesulphonylhydrazide) | 12 |
| Carboxy methyl cellulose | 1 |

The pigment (C.I. Pigment Violet 2) is soluble in dicaprylphthalate.

A wallpaper base paper of substance 90 g/m$^2$ was screen printed with the above ink to a floral design. The combined weight of blowing agent and pigment applied was 4.7 g/m$^2$ to the printed areas.

The printed paper was dried and then coated with a PVC plastisol having the formulations as given in Example 1.

The plastisol was applied as an overall coating of thickness 0.25 mm (corresponding to a polymer weight of 162 g/m$^2$) and then the coated paper was heated in an oven for 60 secs. at 200° C. to effect foaming.

The resultant product displayed the floral design in a fine blister texture which was pale pink in colour, while the parts of the foam that were not above the printed pattern exhibited a smooth white coloured surface.

We claim:

1. Foam plastics sheet material having a decorative finish comprising a substrate web having thereon a base coat and a foam coat in which the base coat comprises an organic pigment and some of the pigment has migrated through the foam coat to the surface of the foam coat so that the overall surface of the material exposes at least two different colourations.

2. Material is claimed in claim 1 in which the foam coat has plural thicknesses and the pigment has migrated only to the surface of least thickness coat.

3. Material as claimed in claim 1 in which the colourations differ in intensity.

4. Material as claimed in claim 1 in which the colourations differ in spectral position.

5. A process for the production of a decorative sheet material comprising applying to at least parts of the surface of a substrate web a composition containing an organic pigment, applying, over at least some of the parts of the substrate to which said organic pigment had been applied, a foamable composition containing a thermoplastic polymeric material and a heat decomposable blowing agent, and heating said coated substrate to effect foaming of the foamable composition, wherein said organic pigment is soluble in, and migrates into, said foamable composition to the extent that some appears on the surface of the material.

6. A process according to claim 5 in which the foamed composition has at least two thicknesses and the pigment has migrated to the surface of the shallower thickness but not to the surface of the deeper thickness.

7. A process according to claim 5 in which the foamable composition includes a polymer dispersed in a plasticiser and the pigment is soluble in the plasticiser.

8. A process according to claim 7 in which the pigment composition contains a polymeric binder.

9. A process according to claim 5 in which the pigment composition is applied at a rate to give a pigment application of from 0.1 to 5 g/m$^2$ and the foamable composition is applied at a rate of from 40 to 1200 g/m$^2$.

10. A process according to claim 5 in which the substrate web is embossed before application of the foamable composition.

11. A process according to claim 5 in which the pigment composition includes a heat decomposable blowing agent which causes foaming of the pigment composition.

* * * * *